United States Patent
Myers

[15] 3,675,627
[45] July 11, 1972

[54] POULTRY WATERER
[72] Inventor: Lawrence A. Myers, Milford, Ind.
[73] Assignee: Chore-Time Equipment, Inc., Milford, Ind.
[22] Filed: April 24, 1970
[21] Appl. No.: 31,486

[52] U.S. Cl. ............................................... 119/72, 119/81
[51] Int. Cl. ................................................... A01k 07/00
[58] Field of Search ...................... 119/72, 74, 78, 79, 80, 81

[56] References Cited

UNITED STATES PATENTS

| | | | |
|---|---|---|---|
| 3,283,746 | 11/1966 | Ruter | 119/81 |
| 2,669,220 | 2/1954 | Goff | 119/81 |
| 2,632,463 | 3/1953 | Martin | 119/81 X |
| 2,790,417 | 4/1957 | Brembeck | 119/72 X |
| 2,821,167 | 1/1958 | Gilbertson | 119/81 |

Primary Examiner—Hugh R. Chamblee
Attorney—Olson, Trexler, Wolters & Bushnell

[57] ABSTRACT

A poultry waterer having a main body member providing an annular trough and adapted to be hung from a centrally located water supply pipe, the body member including channel means for directing water from the pipe to the trough, and a hood member disposed over the body member for preventing roosting of the birds on the waterer and dust or dirt collection in the water.

11 Claims, 7 Drawing Figures

PATENTED JUL 11 1972 3,675,627
SHEET 1 OF 2
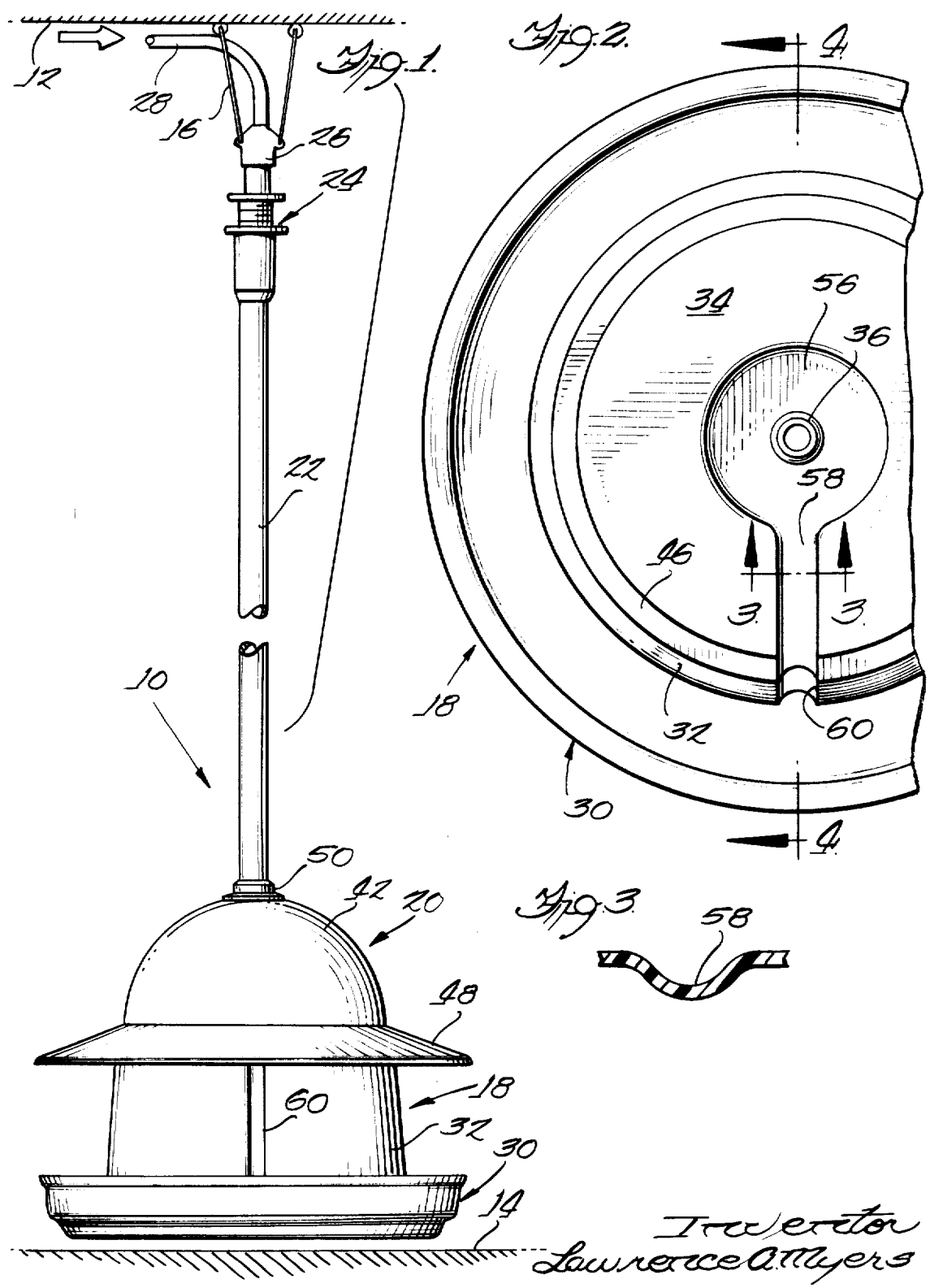
Inventor
Lawrence A. Myers
by: Olson, Trexler, Wolters, & Bushnell
Atty's

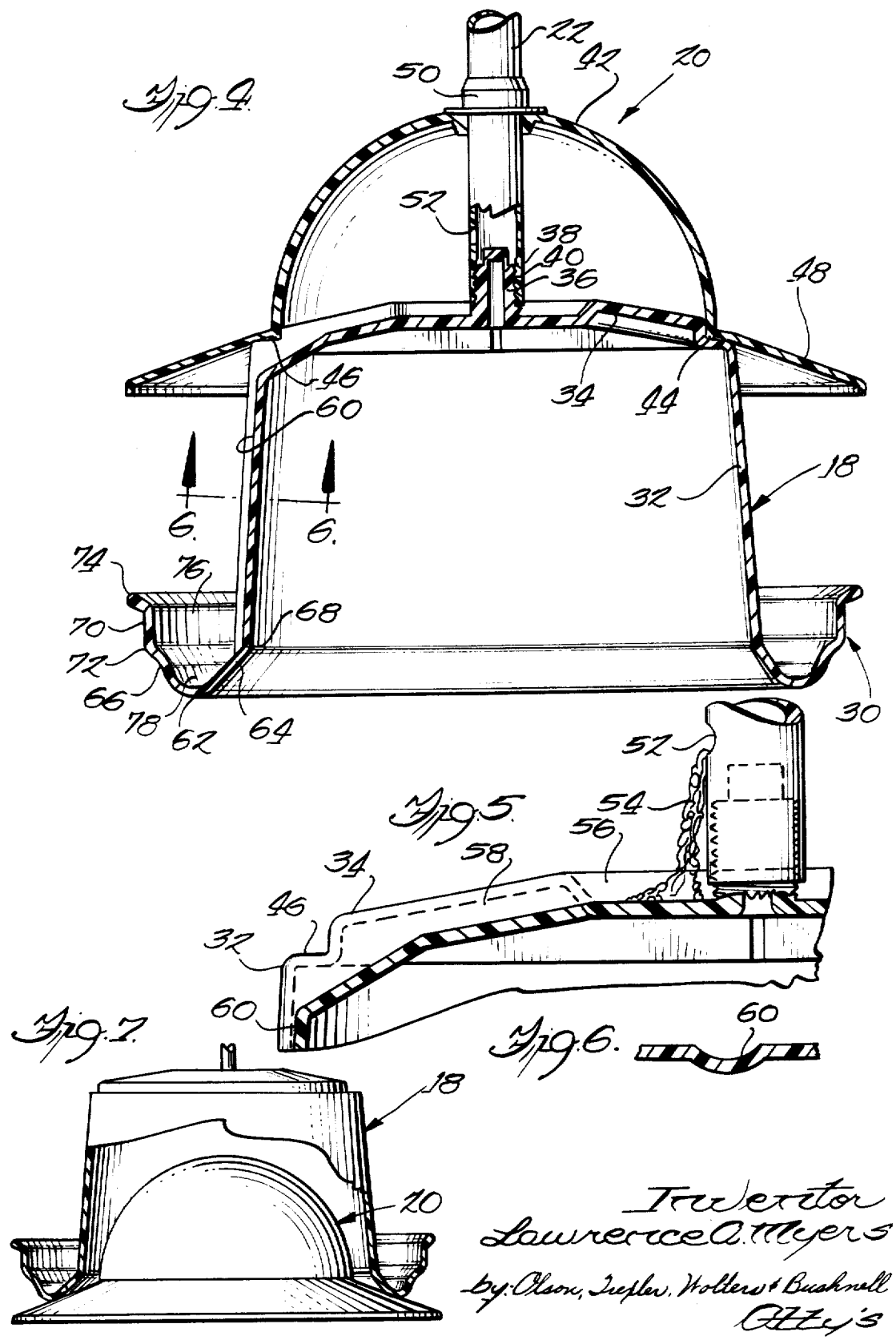

POULTRY WATERER

The present invention relates to novel watering apparatus, and more specifically to a novel waterer especially suitable for use by poultry.

It is an object of the present invention to provide a novel poultry waterer which may be readily installed and adjusted and which is especially suitable for watering birds such as broilers, breeders and the like from one day old through maturity.

A further object of the present invention is to provide a novel poultry waterer having a trough configuration for aiding the poultry in self cleaning the unit.

Still another object of the present invention is to provide a novel poultry waterer having a trough configuration adapted to be filled with water to different depts for facilitating use by the birds of different sizes while minimizing excessive water spillage.

Still another object of the present invention is to provide a novel poultry waterer constructed for minimizing the entry of dust, dirt and the like into the water and for preventing roosting of the birds on the unit.

Still another object of the present invention is to provide a novel poultry waterer of the above described type constructed for effectively shielding the trough portion from the entry of foreign matter without unduly restricting head room for the birds whereby to allow the birds to drink without turning sideways and thereby permitting a larger number of birds to use the unit at one time.

A further object of the present invention is to provide a novel poultry waterer of the above described type constructed for minimizing the possibility of injury to birds as a result of the birds bumping into the unit.

A still further object of the present invention is to provide a novel poultry waterer of the above described type which is constructed so that parts thereof may be stacked in a compact manner for facilitating shipping and storage.

Other objects and advantages of the present invention will become apparent from the following description and the accompanying drawings wherein:

FIG. 1 is a side elevational view showing a poultry waterer unit constructed in accordance with features of the present invention and suspended from the ceiling or an overhead member in a poultry house;

FIG. 2 is a fragmentary plan view of a main body member of a poultry waterer constructed in accordance with features of the present invention;

FIG. 3 is an enlarged fragmentary sectional view taken along line 3—3 in FIG. 2;

FIG. 4 is a partial sectional view taken generally along line 4—4 in FIG. 2;

FIG. 5 is an enlarged fragmentary partial sectional view similar to FIG. 4 and showing a portion of the structure in greater detail;

FIG. 6 is a fragmentary sectional view taken generally along line 6—6 in FIG. 4; and FIG. 7 is a side elevational view partially broken away showing the major parts of the waterer stacked for storage or shipping.

Referring now more specifically to the drawings wherein like parts are designated by the same numerals throughout the various figures, a poultry waterer unit 10 incorporating features of the present invention is shown in FIG. 1 supported from an overhead beam, ceiling or the like 12 of a poultry house in a position slightly raised above the floor 14 of the house. As will be understood, adjustable wires or cables 16 are provided for supporting the waterer unit, which cables or wires may be individually adjustable or replaceable or may be connected with a winch, not shown. This enables the height of the waterer to be adjusted in accordance with the size and growth of the birds. For example, the waterer may be adjusted from a first position resting on the floor, through the position shown in FIG. 1 to a maximum position several inches above the floor and determined in accordance with the size of birds to be watered.

The waterer unit comprises a first or main body member 18 and a dome or cover member 20. These members are preferably formed from a smooth plastic material such as polypropylene which is tough and substantially unbreakable and which at the same time presents marginal or edge portions which are resiliently yieldabLe. The yieldable nature of the material from which the major components of the waterer unit are made minimizes any possibility of the birds injuring themselves as they bump against the waterer during their normal movement within the bird house.

The members 18 and 20 of the waterer unit are connected as will be described below with an upstanding pipe 22 which in turn is connected with a valve unit 24 at its upper end having a cap 26 to which the supporting elements or wires 16 are connected. A water hose or tubing 28 extends from the cap member 26 to a suitable source of supply, not shown. The valve unit 24 is of known construction and therefore need not be described in detail. It suffices to state that the valve is constructed so that it is normally open or, in other words, so that water may normally flow from the supply hose 28 down through the pipe 22. The valve assembly is further constructed so that when a predetermined amount of water has been delivered, the increased weight of the waterer unit as a result of the water supplied thereto will cause the waterer unit to move downwardly against the action of spring means included within the valve so as to close the valve and block the passage of additional water. Of course, when sufficient water has been used or has evaporated so that the overall weight of the waterer unit and water is decreased a predetermined amount, the valve unit will again open to admit additional water. The valve unit is constructed so that it may be adjusted for opening and closing at different weights of water whereby the maximum level of water in the waterer unit can be adjusted and controlled.

As shown in the drawings, the main body member 18 of the waterer unit has a peripheral annular trough portion 30 which merges with an upstanding frusto-conical wall section 32. The upstanding wall section in turn merges with a top or upper end wall 34. In order to secure the member 18 to the pipe 22, an upstanding threaded stud 36 is integrally formed with or otherwise secured to a central portion of the top wall 34. In addition, a lower end portion 38 of the pipe 22 is internally threaded as indicatEd at 40 for cooperative engagement with the stud as shown in FIGS. 4 and 5.

The cover or dome member 20 has a central rounded or generally semi-spherical portion 42 having a peripheral edge 44 adapted to rest on an annular shoulder or seat 46 formed in the margin of the top wall 34. An annular flange 48 projects radially and outwardly and downwardly from the lower margin of the rounded portion 42 so as to substantially overlie the trough portion 30.

The rounded and downwardly sloping configuration of the portions 42 and 48 of the cover member substantially preclude roosting of birds on the waterer unit. In addition, the cover member minimizes any possibility of water being supplied to the trough portion in the manner described below becoming contaminated with dust or other foreign material. It is to be noted, however, that the vertical height of the frusto-conical wall section 32 and thus the vertical spacing between the cover flange 48 and the trough portion 30 is such that adequate head room is provided to permit a bird to drink from the trough portion without turning to one side. Thus, a maximum number of birds can drink freely from the trough portion at one time.

As shown in FIGS. 4 and 5, a lower end portion of the pipe 22 extends through the rounded portion 42 of the dome member and is secured to and sealed by the stud 36. A collar 50 is adhesively or otherwise fixed to the pipe 22 at a position for overlying and engaging the dome member. Thus, the dome member is secured in fixed relationship with respect to the main body member 18 when the pipe is threaded onto the stud 36.

As indicated above, water is delivered to the unit through the pipe 22. Since the lower end of the pipe is substantially sealed by the stud 36, a discharge opening 52 is formed in the wall of the pipe at a location within the rounded portion 42 of the cover member and slightly above the stud 36. Thus, when the valve unit 24 is opened, water will flow downwardly through the pipe 22, and out through the opening 52 and onto the top wall 34 as indicated at 54 in FIG. 5.

Conduit or channel means is provided for directing the water from the discharge opening 52 in the pipe to the trough portion 30. More specifically, an annular groove or collecting basin 56 is integrally formed in the top wall 34 around the stud 36 and thus around the pipe 22 for receiving and collecting substantially all of the water delivered through the opening 52. A relatively narrow groove or channel 58 is similarly formed integrally in the wall 34 and extends from the collecting ring or basin 56 radially outwardly, and merges with a similar groove or channel 60 integrally formed in the frusto-conical wall 32. Thus, water delivered through the opening 52 will be collected and directed to the trough 30 along a controlled narrow path provided by the channels 58 and 60. Since all of the water flows along the same narrow channel means, the possibility of contamination from dust or dirt on the surfaces of the bOdy member 18 is reduced. The possibility of contamination is further greatly minimized by the arrangement of the cover or dome member which extends entirely across the top wall 34 and also overlies the frustoconical wall 32 and the trough portion 30 so as to prevent dirt or dust from falling directly into the water conveying channel means.

As shown best in FIG. 4, the annular trough portion 30 has a rounded bottom section 62 defined by an arc having a relatively small radius, which bottom section merges with oppositely upwardly inclined or diverging wall sections 64 and 66. The wall section 64 merges with the frusto-conical side wall 32 along junction line 68 and the outwardly flaring wall section 66 merges with another relatively upstanding wall section 70 at junction line 72. Preferably, the radius of section 62 is about one-fourth the maximum width of the trough. The upstanding wall section 70 in turn merges with a peripheral narrow annular lip 74 which helps to catch any water dribbling from the bills of birds so as to minimize spillage.

With the structure just described, the trough portion 30, when viewed in cross section as shown in FIG. 4, has a relatively wide upper portion or mouth 76 and a relatively narrow lower portion 78 defined by the wall sections 62, 64 and 66. It is contemplated that when the water is used with baby chicks or very small birds, the valve unit 24 will be adjusted so as to fill the trough portion 30 sufficiently so that the water level will be near the top of the wall section 70. In other words, the relatively wide upper portion 76 of the trough will be substantially filled so as to enable the baby or small birds to reach the water without climbing or falling into the trough.

When larger or substantially full grown birds are to use the waterer, the valve unit 24 is adjusted so that only the lower relatively narrow part 78 of the trough is filled. The narrow configuration of the lower trough portion enables water of sufficient depth to facilitate drinking to be maintained. At the same time the level of the water may be maintained below the wide portion 76 or, in other words, well below the uppermost edge of the trough so as to minimize any possibility of water being splashed and spilled from the trough when the water unit is bumped by the birds. The relatively narrow and sufficiently deep configuration of the lower trough portion also enables the amount of water maintained in the trough tO be minimized so as to facilitate the picking of food or other foreign material from the trough by the birds, or in other words, to promote self-cleaning of the trough.

As indicated above, the wall section 32 on the body member 18 is preferably of frusto-conical configuration so that the lower end has an internal diameter at least slightly greater than the minimum diameter of the shoulder 46. The internal diameter is related to the maximum diameter of the rounded or semi-spherical part 42 of the dome member. The construction is such that the members 18 and 20 can be stacked together with the dome portion 42 housed within the frusto-conical wall section 32 as shown in FIG. 7 whereby to facilitate shipping or storing of the structure.

While a preferred embodiment of the present invention has been shown and described herein, it is obvious that many structural details may be changed without departing from the spirit and scope of the appended claims.

The invention is claimed as follows:

1. A waterer comprising a first member including an annular trough portion and annular wall means extending upwardly from an inner side of said trough portion and comprising a central top portion, a cover member over said first member and substantially completely confining an upper surface of said top portion for preventing contamination of said upper surface, water supply pipe means extending beneath said cover member and having water discharge means beneath said cover member and over said top portion, channel means in said wall means beneath said cover member for directing water from said discharge means to said trough portion, stud means on said top portion, said water supply pipe means being connected to said stud means, and said discharge means comprising an opening in the side of said pipe means.

2. A waterer, as defined in claim 1, wherein said means for directing water from the discharge means to the trough comprises catch basin means in said top portion around said stud means and communicating with said channel means.

3. A waterer, as defined in claim 1, wherein said cover member includes a rounded portion for discouraging roosting on the waterer.

4. A waterer, as defined in claim 3, wherein said cover member comprises an outwardly and downwardly extending flange projecting from said rounded portion and overlying said trough portion.

5. A waterer, as defined in claim 1, wherein said trough portion has a cross-sectional configuration with a relatively narrow bottom part of substantial depth and a relatively wide upper part, the trough portion being adapted to have only the lower narrow part thereof filled with water for watering larger or full grown birds and to have the upper relatively wide part thereof filled with water when watering small or baby birds.

6. A waterer, as defined in claim 5, wherein said trough portion comprises a narrow peripheral annular lip extending radially outwardly and upwardly from an upper margin of said relatively wide part for minimizing spillage.

7. A waterer comprising, a one piece plastic member having an annular trough portion having radially spaced inner and outer walls, an upstanding annular sidewall integral with the inner wall of said trough portion and a transverse top wall integral with an upper margin of said sidewall, a cover member resting on an upper margin of said sidewall and extending over said top wall for preventing contamination thereof and including an annular flange overlying said trough portion, water supply pipe means extending through said cover member and secured to said top wall for supporting said members, said pipe means having a discharge opening beneath said cover member and above said top wall, and said top wall including channel means for directing water from said discharge opening to said trough.

8. A waterer, as defined in claim 7, wherein said cover member comprises a one-piece plastic member including a rounded central portion for discouraging of roosting on the waterer, said annular flange being integral with and projecting from a lower margin of said rounded portion.

9. A waterer, as defined in claim 7, wherein said trough portion has a cross sectional configuration having a relatively narrow bottom part and a relatively wide upper part, said bottom part being defined by a rounded bottom section having a radius similar to and not substantially greater than about one-fourth of the width of said relatively wide upper part, said bottom portion being further defined by diverging wall sections flaring from integral junctions with said rounded wall section to integral junctions with additional upstanding wall sections defining said relatively wide upper part.

10. A waterer, as defined in claim 9, wherein said trough portion includes a narrow annular lip integral with an upper margin of an outer wall section defining said upper part and projecting outwardly and upwardly therefrom for minimizing spillage.

11. A waterer, as defined in claim 7, wherein said rounded central portion of the cover member has a predetermined radius and said annular sidewall of the first mentioned member has a radius at a lower end thereof at least substantially as great as said predetermined radius whereby said members may be stacked for shipping or storing with the rounded portion of the cover member resting within said annular sidewall.

* * * * *